United States Patent
Shen et al.

(10) Patent No.: US 10,301,472 B2
(45) Date of Patent: May 28, 2019

(54) POLY(ETHERIMIDE-SILOXANE)-POLYESTER COMPOSITIONS, METHOD OF MANUFACTURE, AND ARTICLES MADE THEREFROM

(71) Applicant: SABIC Global Technologies B.V., Bergen op Zoom (NL)

(72) Inventors: Liang Shen, Shanghai (CN); Wei Shan, Shanghai (CN)

(73) Assignee: SABIC Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 15/561,639

(22) PCT Filed: Mar. 30, 2016

(86) PCT No.: PCT/IB2016/051804
§ 371 (c)(1),
(2) Date: Sep. 26, 2017

(87) PCT Pub. No.: WO2016/157096
PCT Pub. Date: Oct. 6, 2016

(65) Prior Publication Data
US 2018/0072885 A1    Mar. 15, 2018

Related U.S. Application Data

(60) Provisional application No. 62/140,525, filed on Mar. 31, 2015.

(51) Int. Cl.
| | | |
|---|---|---|
| C08L 83/12 | (2006.01) | |
| C08L 79/08 | (2006.01) | |
| C08G 77/455 | (2006.01) | |
| C08L 83/10 | (2006.01) | |
| H01B 3/30 | (2006.01) | |
| H01B 3/42 | (2006.01) | |
| H01B 3/46 | (2006.01) | |
| C08L 67/00 | (2006.01) | |

(52) U.S. Cl.
CPC ............ *C08L 79/08* (2013.01); *C08G 77/455* (2013.01); *C08L 67/00* (2013.01); *C08L 83/10* (2013.01); *C08L 83/12* (2013.01); *H01B 3/306* (2013.01); *H01B 3/421* (2013.01); *H01B 3/46* (2013.01); *C08L 2203/202* (2013.01); *C08L 2207/04* (2013.01); *C08L 2666/78* (2013.01); *C08L 2666/84* (2013.01)

(58) Field of Classification Search
None
See application file for complete search history.

(56) References Cited

U.S. PATENT DOCUMENTS

| | | | |
|---|---|---|---|
| 4,690,997 A | 9/1987 | Cella et al. | |
| 5,385,970 A * | 1/1995 | Gallucci | C08L 69/00 |
| | | | 524/538 |
| 5,660,932 A | 8/1997 | Durston | |
| 5,910,365 A * | 6/1999 | Castellani | C08K 5/0008 |
| | | | 174/110 SR |
| 7,847,023 B2 | 12/2010 | Gallucci et al. | |
| 8,071,693 B2 | 12/2011 | Banerjee et al. | |
| 2009/0234060 A1 | 9/2009 | Haralur et al. | |
| 2010/0147548 A1 | 6/2010 | Bhandari et al. | |

FOREIGN PATENT DOCUMENTS

| | | | | |
|---|---|---|---|---|
| EP | 1787808 A1 * | 5/2007 | ............ | B32B 27/08 |
| WO | 2008112742 A1 | 9/2008 | | |
| WO | 2016137878 | 9/2016 | | |
| WO | 2016157082 | 10/2016 | | |
| WO | 2016160814 | 10/2016 | | |

OTHER PUBLICATIONS

International Search Report for International Application No. PCT/IB2016/051775; International Filing Date: Mar. 29, 2016; dated Jun. 8, 2016; 5 pages.
International Search Report for International Application No. PCT/IB2016/051804; International Filing Date: Mar. 30, 2017; dated May 30, 2016; 5 pages.
International Search Report for International Application No. PCT/US2016/024727; International Filing Date: Mar. 29, 2016; dated Jun. 6, 2016; 5 pages.
Written Opinion of the International Searching Authority for International Application No. PCT/IB2016/051804; International Filing Date: Mar. 30, 2017; dated May 30, 2016; 6 pages.
Written Opinion of the International Searching Authority for International Application No. PCT/IB2016/051775; International Filing Date: Mar. 29, 2016; dated Jun. 8, 2016; 6 pages.
Written Opinion of the International Searching Authority for International Application No. PCT/US2016/024727; International Filing Date: Mar. 29, 2016; dated Jun. 6, 2016; 6 pages.

* cited by examiner

*Primary Examiner* — Robert S Loewe
(74) *Attorney, Agent, or Firm* — Cantor Colburn LLP

(57) ABSTRACT

A thermoplastic composition includes 35-95 weight percent of a poly(etherimide-siloxane) copolymer having a siloxane content of more than 0 to less than 50 weight percent based on the total weight of the poly (etherimide-siloxane) copolymer, 5-65 weight percent of a polyester, and 0-20 weight percent of one or more additives, wherein the weight percent of each component is based on the combined weight of the polymer components. An electrical wire including a wire conductor and a coating including the thermoplastic composition and an article including the electrical wire are also described.

15 Claims, No Drawings

POLY(ETHERIMIDE-SILOXANE)-POLYESTER COMPOSITIONS, METHOD OF MANUFACTURE, AND ARTICLES MADE THEREFROM

CROSS-REFERENCE TO RELATED APPLICATIONS

This application is a National Stage application of PCT/IB2016/051804, filed Mar. 30, 2016, which claims the benefit of U.S. Provisional Application No. 62/140,525, filed Mar. 31, 2015, both of which are incorporated by reference herein in their entirety.

BACKGROUND

This disclosure relates to poly(etherimide-siloxane) copolymers, and in particular to thermoplastic compositions comprising a combination of poly(etherimide-siloxane) copolymers and polyesters, methods of their manufacture, and articles containing the thermoplastic compositions.

Poly(etherimide-siloxane) copolymers have been used as coatings for electrical wires due to their flame resistant properties and high temperature stability. However, for some applications, greater impact strength, particularly in combination with low flexural modulus and high tensile elongation is desirable. Furthermore, to be useful in some high-heat, thin-walled wire coating applications, the wire coatings further need high tear strength. Accordingly, there remains a need in the art for improved poly(etherimide-siloxane) thermoplastic compositions having at the desired combination of physical properties, including low flammability, high temperature stability, and high impact strength. It would be particularly useful if the compositions further have low flexural modulus and high tensile elongation. For some applications, improved tear strength in combination with the foregoing properties would be especially useful.

BRIEF DESCRIPTION

In an embodiment, a thermoplastic composition includes 35-95 weight percent of a poly(etherimide-siloxane) copolymer having a siloxane content of more than 0 to less than 50 weight percent based on the total weight of the poly(etherimide-siloxane) copolymer, 5-65 weight percent of a polyester, and 0-20 weight percent of one or more additives, wherein the weight percent of each component is based on the combined weight of the polymer components.

Another embodiment is an article comprising the thermoplastic composition, wherein the article is an extruded part, an injection molded part, or a hot-compressed part.

Another embodiment is an electrical wire including a conductor wire and a covering disposed over the conductor wire, wherein the covering comprises the thermoplastic composition, and wherein the thermoplastic composition coating the conductor wire has one or more of the following properties: a tensile stress of greater than 20 MPa, determined according to UL-1581 after 24 hours at 23° C.; a tensile elongation of greater than 10% as extruded, determined according to UL-1581.

Another embodiment is an article including the electrical wire.

The above described and other features are exemplified by the following Detailed Description.

DETAILED DESCRIPTION

Described herein are thermoplastic compositions comprising a poly(etherimide-siloxane) copolymer and a polyester. The inventors hereof have unexpectedly discovered that combinations of poly(etherimide-siloxane)s with specific polyesters can provide desirable properties, including one or more of high impact strength, low flexural modulus, high tensile elongation, and high tear strength, while at the same time retaining desirable heat aging performance and flame retardant properties. The compositions are particularly useful for the preparation of electrical wire coatings, especially for use in transportation applications such as aircraft, train, boats, and the like.

The poly(etherimide-siloxane) copolymers comprise polyetherimide units and polysiloxane units, for example 5 to 1000, or 10 to 500, etherimide units and siloxane units. The polyetherimide units comprise structural units of formula (1)

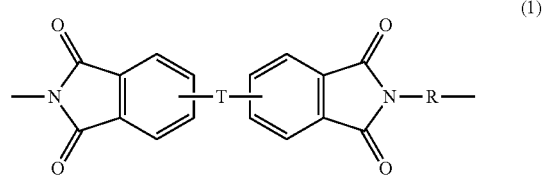

wherein each R is the same or different, and is a substituted or unsubstituted divalent organic group, such as a $C_{6-20}$ aromatic hydrocarbon group or a halogenated derivative thereof, a straight or branched chain $C_{2-20}$ alkylene group or a halogenated derivative thereof, a $C_{3-8}$ cycloalkylene group or halogenated derivative thereof, in particular a divalent group of formula (2)

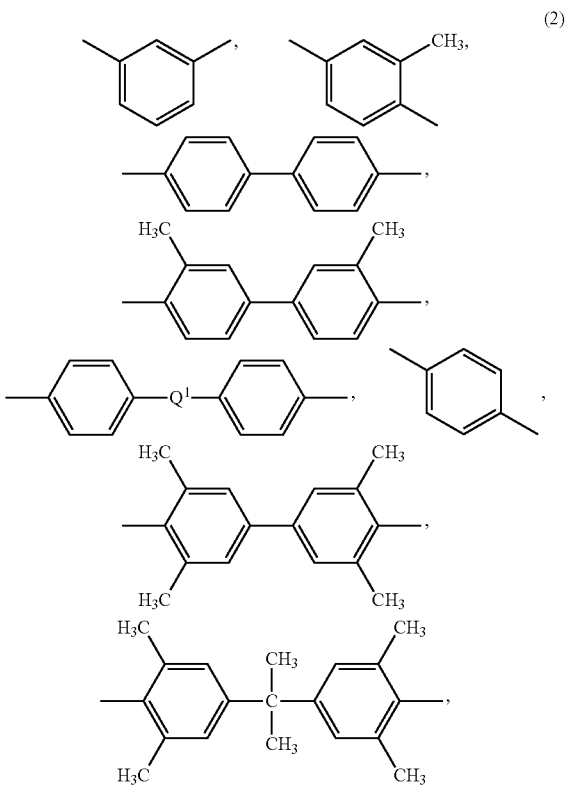

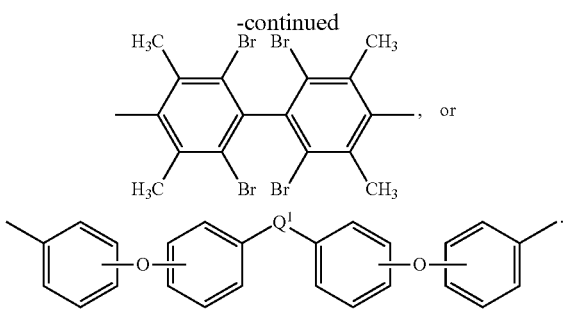

wherein $Q^1$ is —O—, —S—, —C(O)—, —SO$_2$—, —SO—, —C$_y$H$_{2y}$— wherein y is an integer from 1 to 5 or a halogenated derivative thereof (which includes perfluoroalkylene groups), or —(C$_6$H$_{10}$)$_z$— wherein z is an integer from 1 to 4. In an embodiment R is m-phenylene, p-phenylene, or a diaryl sulfone.

Further in formula (1), T is —O— or a group of the formula —O—Z—O— wherein the divalent bonds of the —O— or the —O—Z—O— group are in the 3,3', 3,4', 4,3', or the 4,4' positions. The group Z in —O—Z—O— of formula (1) is also a substituted or unsubstituted divalent organic group, and can be an aromatic C$_{6-24}$ monocyclic or polycyclic moiety optionally substituted with 1 to 6 C$_{1-8}$ alkyl groups, 1 to 8 halogen atoms, or a combination thereof, provided that the valence of Z is not exceeded. Exemplary groups Z include groups derived from a dihydroxy compound of formula (3)

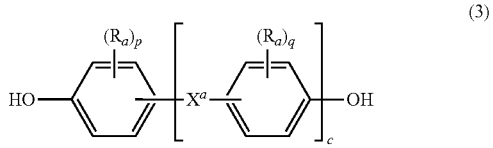

wherein $R^a$ and $R^b$ can be the same or different and are a halogen atom or a monovalent C$_{1-6}$ alkyl group, for example; p and q are each independently integers of 0 to 4; c is 0 to 4; and $X^a$ is a bridging group connecting the hydroxy-substituted aromatic groups, where the bridging group and the hydroxy substituent of each C$_6$ arylene group are disposed ortho, meta, or para (specifically para) to each other on the C$_6$ arylene group. The bridging group $X^a$ can be a single bond, —O—, —S—, —S(O)—, —S(O)$_2$—, —C(O)—, or a C$_{1-18}$ organic bridging group. The C$_{1-18}$ organic bridging group can be cyclic or acyclic, aromatic or non-aromatic, and can further comprise heteroatoms such as halogens, oxygen, nitrogen, sulfur, silicon, or phosphorous. The C$_{1-18}$ organic group can be disposed such that the C$_6$ arylene groups connected thereto are each connected to a common alkylidene carbon or to different carbons of the C$_{1-18}$ organic bridging group. A specific example of a group Z is a divalent group of formula

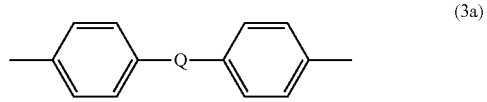

wherein Q is —O—, —S—, —C(O)—, —SO$_2$—, —SO—, or —C$_y$H$_{2y}$— wherein y is an integer from 1 to 5 or a halogenated derivative thereof (including a perfluoroalkylene group). In a specific embodiment Z is a group derived from bisphenol A, such that Q in formula (3a) is 2,2-isopropylidene.

In an embodiment in formula (1), R is m-phenylene or p-phenylene and T is —O—Z—O— wherein Z is a divalent group of formula (3a). Alternatively, R is m-phenylene or p-phenylene and T is —O—Z—O— wherein Z is a divalent group of formula (3a) and Q is 2,2-isopropylidene.

The polyetherimide blocks can be prepared by any of the methods well known to those skilled in the art, including the reaction of an aromatic bis(ether anhydride) of formula (5) with an organic diamine of formula (6)

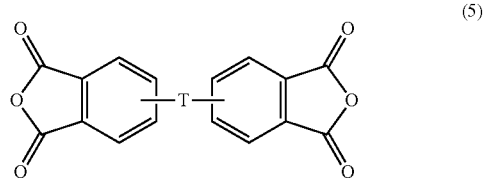

wherein T and R are defined as described above. Copolymers of the polyetherimides can be manufactured using a combination of an aromatic bis(ether anhydride) of formula (5) and a different bis(anhydride), for example a bis(anhydride) wherein T does not contain an ether functionality, for example T is a sulfone.

Illustrative examples of bis(anhydride)s include 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy) benzophenone dianhydride; and, 4-(2,3-dicarboxyphenoxy)-4'-(3,4-dicarboxyphenoxy)diphenyl sulfone dianhydride, as well as various combinations thereof.

Examples of organic diamines include trimethylenediamine, diethylenetriamine, triethylene tetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis(p-amino-t-butylphenyl) ether, bis(p-methyl-o-aminophenyl) benzene, bis(p-methyl-o-aminopentyl) benzene, 1,3-diamino-4-isopropylbenzene, bis(4-aminophenyl) sulfide, bis-(4-aminophenyl) sulfone, and bis(4-aminophenyl) ether. Combinations of these compounds can also be used. In some embodiments the organic diamine is m-phenylenediamine, p-phenylenediamine, sulfonyl dianiline, or a combination comprising one or more of the foregoing.

The siloxane blocks contain units of formula (7)

wherein each R' is independently a $C_{1-13}$ monovalent hydrocarbyl group. For example, each R' can independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups can be fully or partially halogenated with fluorine, chlorine, bromine, or iodine, or a combination comprising at least one of the foregoing. In an embodiment no bromine or chlorine is present, and in another embodiment no halogens are present. Combinations of the foregoing R groups can be used in the same copolymer. In an embodiment, the polysiloxane block comprises R' groups that have minimal hydrocarbon content. In a specific embodiment, an R' group with a minimal hydrocarbon content is a methyl group.

The poly(etherimide-siloxane) copolymers can be formed by polymerization of an aromatic bisanhydride (5) and a diamine component comprising an organic diamine (6) as described above or mixture of diamines, and a polysiloxane diamine of formula (8)

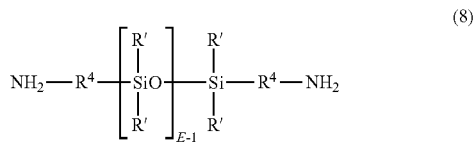

wherein R' and E are as described in formula (7), and each $R^4$ is independently a $C_2$-$C_{20}$ hydrocarbon moiety, in particular a $C_2$-$C_{20}$ arylene, alkylene, or arylenealkylene group. In an embodiment $R^4$ is a $C_2$-$C_{20}$ alkylene group, specifically a $C_2$-$C_{10}$ alkylene group such as propylene, and E has an average value of 5 to 100, 5 to 75, 5 to 60, 5 to 15, or 15 to 40. Procedures for making the polysiloxane diamines of formula (8) are well known in the art.

In some poly(etherimide-siloxane) copolymers the diamine component used in the manufacture of the copolymers can contain 10 to 90 mole percent (mol %), or 20 to 50 mol %, or 25 to 40 mol % of polysiloxane diamine (8) and 10 to 90 mol %, or 50 to 80 mol %, or 60 to 75 mol % of diamine (6), for example as described in U.S. Pat. No. 4,404,350. The diamine components can be physically mixed prior to reaction with the bisanhydride(s), thus forming a substantially random copolymer. Alternatively, block or alternating copolymers can be formed by selective reaction of (6) and (8) with aromatic bis(ether anhydrides (5), to make polyimide blocks that are subsequently reacted together. Thus, the poly(etherimide-siloxane) copolymer can be a block, random, or graft copolymer. Block poly(etherimide-siloxane) copolymers comprise etherimide blocks and siloxane blocks in the polymer backbone. The etherimide blocks and the siloxane blocks can be present in random order, as blocks (i.e., AABB), alternating (i.e., ABAB), or a combination thereof. Graft poly(etherimide-siloxane) copolymers are non-linear copolymers comprising the siloxane blocks connected to linear or branched polymer backbone comprising etherimide blocks.

Examples of specific poly(etherimide-siloxane)s are described in U.S. Pat. Nos. 4,404,350, 4,808,686 and 4,690,997. In an embodiment, the poly(etherimide-siloxane) copolymer has units of formula (9)

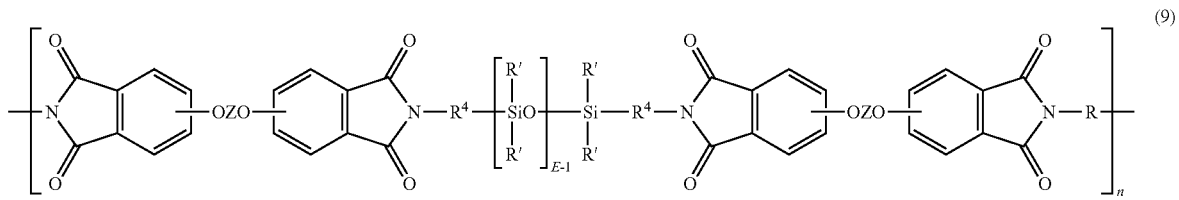

wherein R' and E of the siloxane are as in formula (5), the R and Z of the imide are as in formula (1), $R^4$ is the same as $R^4$ as in formula (8), and n is an integer from 5 to 100. In a specific embodiment, the R is a phenylene, Z is a residue of bisphenol A, $R^4$ is n-propylene, E is 2 to 50, 5 to 30, or 10 to 40, n is 5 to 100, and each R' of the siloxane is methyl.

The relative amount of polysiloxane units and etherimide units in the poly(etherimide-siloxane) copolymer depends on the desired properties, and are selected using the guidelines provided herein. In particular, the poly(etherimide-siloxane) copolymer is selected to have a certain average value of E, and is selected and used in amount effective to provide the desired weight percent (wt %) of siloxane units in the thermoplastic composition. In an embodiment the poly(etherimide-siloxane) comprises 5 to 50 wt %, 10 to 40 wt %, or 20 to 35 wt % siloxane units, based on the total weight of the poly(etherimide-siloxane). In some embodiments the polysiloxane block of the copolymer has a number average molecular weight (Mn) of 300 to 3000 grams/mole (Daltons).

The polyetherimides can have a melt index of 0.1 to 10 grams per minute (g/min), as measured by American Society for Testing Materials (ASTM) D1238 at 340 to 370° C., using a 6.7 kilogram (kg) weight. In some embodiments, the polyetherimide polymer has a weight average molecular weight (Mw) of 1,000 to 150,000 Daltons, or 10,000 to 80,000 Daltons, as measured by gel permeation chromatography, using polystyrene standards. Such polyetherimide polymers typically have an intrinsic viscosity greater than 0.2 deciliters per gram (dl/g), or, more specifically, 0.35 to 0.7 dl/g as measured in m-cresol at 25° C. The poly(etherimide-siloxane) copolymer can have a number average molecular weight (Mn) of 5,000 to 50,000 Daltons, or 10,000 to 30,000 Daltons.

The thermoplastic composition can comprise a combination of two or more poly(etherimide-siloxane) copolymers. The copolymers can be used in any proportion. For example, when two copolymers are used the weight ratio of the first copolymer to the second copolymer can be 1:99 to 99:1. Ternary blends and higher are also contemplated.

The poly(etherimide-siloxane) copolymers are combined, preferably blended, with polyesters to form a thermoplastic composition. "Polyester" as used herein includes polyesters, polyester copolymers, and combinations of the foregoing. Useful polyesters include, for example, polyesters having repeating units of formula (10)

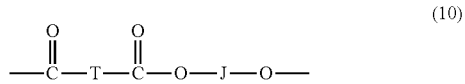
(10)

wherein J is a divalent group derived from a dihydroxy compound (including a reactive derivative thereof), and can be, for example, a $C_{2-10}$ alkylene, a $C_{6-20}$ cycloalkylene, a $C_{6-20}$ arylene, or a polyoxyalkylene in which the alkylene groups contain 2 to 6 carbon atoms, specifically 2, 3, or 4 carbon atoms; and T is a divalent group derived from a dicarboxylic acid (including a reactive derivative thereof), and can be, for example, a $C_{2-20}$ alkylene, a $C_{6-20}$ cycloalkylene, or a $C_{6-20}$ arylene. Copolyesters containing a combination of different T and J groups can be used. The polyester units can be branched or linear.

In an embodiment, J is a $C_{2-30}$ alkylene group having a straight chain, branched chain, or cyclic (including polycyclic) structure, for example ethylene, n-propylene, i-propylene, 1,4-butylene, 1,6-cyclohexylene, or 1,4-methylenecyclohexane. In another embodiment, J is derived from a bisphenol-containing moiety, for example bisphenol A. In another embodiment, J is derived from an aromatic dihydroxy compound, for example, resorcinol.

Aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, or a combination comprising at least one of the foregoing acids. Acids containing fused rings can also be present, such as 1,4-, 1,5-, or 2,6-naphthalenedicarboxylic acids. Specific dicarboxylic acids include terephthalic acid, isophthalic acid, naphthalene dicarboxylic acid, 1,4-cyclohexane dicarboxylic acid, or a combination comprising at least one of the foregoing acids. A specific dicarboxylic acid comprises a combination of isophthalic acid and terephthalic acid wherein the weight ratio of isophthalic acid to terephthalic acid is 91:9 to 2:98.

Specific ester units include ethylene terephthalate, n-propylene terephthalate, n-butylene terephthalate, 1,4-cyclohexanedimethylene terephthalate, and ester units derived from isophthalic acid, terephthalic acid, and resorcinol (ITR)).

The polyesters can be obtained by interfacial polymerization or melt-process condensation, by solution phase condensation, or by transesterification polymerization wherein, for example, a dialkyl ester such as dimethyl terephthalate can be transesterified with ethylene glycol using acid catalysis, to generate poly(ethylene terephthalate). A branched polyester, in which a branching agent, for example, a glycol having three or more hydroxyl groups or a trifunctional or multifunctional carboxylic acid has been incorporated, can be used. Furthermore, it can be desirable to have various concentrations of acid and hydroxyl end groups on the polyester, depending on the ultimate end use of the composition.

Useful polyesters can include aromatic polyesters, poly(alkylene esters) including poly(alkylene arylates), and poly(cycloalkylene diesters). Aromatic polyesters can have a polyester structure according to formula (10), wherein J and T are each aromatic groups as described above. In an exemplary embodiment, useful aromatic polyesters can include poly(isophthalate-terephthalate-resorcinol) esters, poly(isophthalate-terephthalate-bisphenol A) esters, or a combination comprising at least one of these. Also contemplated are aromatic polyesters with a minor amount, e.g., 0.5 to 10 weight percent, based on the total weight of the polyester, of units derived from an aliphatic diacid and an aliphatic polyol to make copolyesters. Poly(alkylene arylates) can have a polyester structure according to formula (10), wherein T comprises groups derived from aromatic dicarboxylates, cycloaliphatic dicarboxylic acids, or derivatives thereof. Examples of specifically useful T groups include 1,2-, 1,3-, and 1,4-phenylene; 1,4- and 1,5-naphthalenes; cis- or trans-1,4-cyclohexylene; and the like. Specifically, where T is 1,4-phenylene, the poly(alkylene arylate) is a poly(alkylene terephthalate). In addition, for poly(alkylene arylate), specifically useful alkylene groups J include, for example, ethylene, 1,4-butylene, and bis-(alkylene-disubstituted cyclohexane) including cis- or trans-1,4-(cyclohexylene)dimethylene. Illustrative examples of poly(alkylene terephthalates) include poly(ethylene terephthalate) (PET), poly(1,4-butylene terephthalate) (PBT), and poly(n-propylene terephthalate) (PPT). Also useful are poly(alkylene naphthalates), such as poly(ethylene naphthalate) (PEN), and poly(butylene naphthalate) (PBN). A specifically useful poly(cycloalkylene diester) is poly(1,4-cyclohexanedimethylene terephthalate) (PCT). Combinations comprising at least one of the foregoing polyesters can also be used.

Copolymers comprising alkylene terephthalate repeating ester units with other ester groups can also be useful. Specifically useful ester units can include different alkylene terephthalate units, which can be present in the polymer chain as individual units, or as blocks of poly(alkylene terephthalates). Copolymers of this type include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s can also include poly(alkylene cyclohexanedicarboxylate)s. Of these, a specific example is poly(1,4-cyclohexane-dimethanol-1,4-cyclohexanedicarboxylate) (PCCD), having recurring units of formula (11)

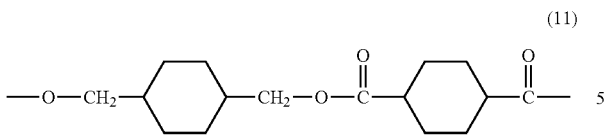
(11)

wherein, as described using formula (10), J is a 1,4-cyclohexanedimethylene group derived from 1,4-cyclohexanedimethanol, and T is a cyclohexane ring derived from cyclohexanedicarboxylate or a chemical equivalent thereof, and can comprise the cis-isomer, the trans-isomer, or a combination comprising at least one of the foregoing isomers.

In some embodiments, the polyester is a poly(ether-ester) block copolymer, also known in the art as thermoplastic elastomers or thermoplastic ester elastomers (TPEE). Poly(ether-ester) block copolymers consist essentially of "soft block" long-chain ester units of formula (12)

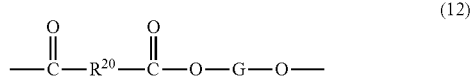
(12)

wherein G is a derived from a poly($C_1$-$C_4$ alkylene oxide) glycol having a number-average molecular weight of 400 to 6000, and $R^{20}$ is derived from a $C_4$-$C_{24}$ aliphatic or aromatic dicarboxylic acid, preferably an aromatic dicarboxylic acid; and "hard block" short-chain ester units of formula (13)

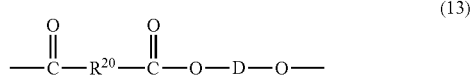
(13)

wherein D is a $C_1$-$C_{10}$ alkylene or cycloalkylene derived from the corresponding diol having a molecular weight of less than or equal to 300; and $R^{20}$ is derived from a $C_8$-$C_{24}$ alicyclic or aromatic dicarboxylic acid, preferably an aromatic dicarboxylic acid; with the proviso that the short-chain ester units constitute about 40% to about 90% by weight of the poly(ether-ester) block copolymer, and the long-chain ester units constitute about 10% to about 60% by weight of the poly(ether-ester) block copolymer.

A variety of poly(ether-ester) copolymers are commercially available, for example under the trademarks ARNITEL EM400 and ARNITEL EL630 poly(ether-ester) copolymers from DSM; HYTREL 3078, HYTREL 4056, HYTREL 4556, and HYTREL 6356 poly(ether-ester) copolymers from DuPont; and ECDEL 9966 poly(ether-ester) copolymer from Eastman Chemical. In all cases, the soft block is derived from tetrahydrofuran. In the HYTREL 4556, HYTREL 6356, ARNITEL EM400, and ARNITEL EL630 poly(ether-ester) copolymers, the hard block is based on poly(butylene terephthalate) (PBT). In the HYTREL 4056 poly(ester-ether) copolymer, the hard block contains isophthalate units in addition to terephthalate units. In the ECDEL 9966 poly(ether-ester) copolymer, the hard block is based on poly(1,4-cyclohexane-dimethanol-1,4-cyclohexane dicarboxylate) (PCCD) units.

Polyester as used herein can also include copolymers comprising carbonate units ("poly(carbonate-ester)s"). Poly(carbonate-ester)s further comprise, in addition to recurring ester units of formula (10), repeating carbonate units of formula (14)

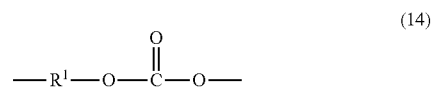
(14)

wherein at least 60 percent of the total number of $R^1$ groups are aromatic, or each $R^1$ contains at least one $C_{6-30}$ aromatic group. Specifically, each $R^1$ can be derived from a dihydroxy compound such as an aromatic dihydroxy compound of formula (15) or a bisphenol compound of formula (16).

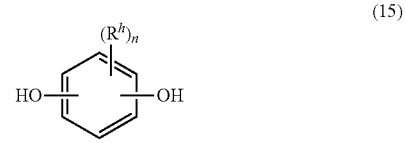
(15)

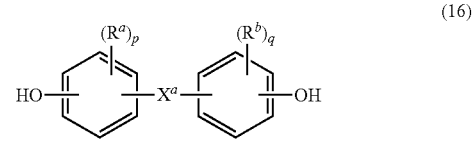
(16)

In formula (15), each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4.

In formula (16), $R^a$ and $R^b$ are each independently a halogen, $C_{1-12}$ alkoxy, or $C_{1-12}$ alkyl, and p and q are each independently integers of 0 to 4, such that when p or q is less than 4, the valence of each carbon of the ring is filled by hydrogen. In an embodiment, p and q is each 0, or p and q is each 1, and $R^a$ and $R^b$ are each a $C_{1-3}$ alkyl group, specifically methyl, disposed meta to the hydroxy group on each arylene group. $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group, for example, a single bond, —O—, —S—, —S(O)—, —S(O)$_2$—, —C(O)—, or a $C_{1-18}$ organic group, which can be cyclic or acyclic, aromatic or non-aromatic, and can further comprise heteroatoms such as halogens, oxygen, nitrogen, sulfur, silicon, or phosphorous. For example, $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group.

Specific ester units include ethylene terephthalate units, n-propylene terephthalate units, n-butylene terephthalate units, ester units derived from isophthalic acid, terephthalic acid, and resorcinol (ITR ester units), and ester units derived from sebacic acid and bisphenol A. The molar ratio of ester units to carbonate units in the polyester-carbonates can vary broadly, for example 1:99 to 99:1, specifically, 10:90 to 90:10, more specifically, 25:75 to 75:25, or from 2:98 to 15:85. A specific poly(carbonate-ester) is poly[(isophthalate-terephthalate-resorcinol) ester-co-(isophthalate-terephthalate-bisphenol A)] ester.

The relative amount of the poly(etherimide-siloxane) copolymer and the polyester can be adjusted to yield the desired combination of properties. In some embodiments, the poly(etherimide-siloxane) copolymer is present in an amount of 35 to 95 weight percent, or, more specifically, in an amount of 40 to 90 weight percent, each based on the combined weight of the poly(etherimide-siloxane) copolymer and the polyester. In some embodiments, the polyester is present in an amount of 5 to 65 weight percent, or, more specifically, in an amount of 10 to 60 weight percent, based on the combined weight of the poly(etherimide-siloxane) copolymer and the polyester.

The thermoplastic composition can further include additives known in the art for use in wire coating applications, provided that the additives do not substantially adversely affect the desired properties of the compositions. Such additives include UV absorbers, light stabilizers, heat stabilizers, lubricants, plasticizers, pigments, dyes, colorants, anti-static agents, foaming agents, blowing agents, metal deactivators, antioxidants, nucleating agents, and combinations comprising one or more of the foregoing additives.

Antioxidants can be compounds such as phosphites, phosphonites and hindered phenols or mixtures thereof. Phosphorus containing stabilizers including triaryl phosphite and aryl phosphonates are of note as useful additives. Difunctional phosphorus containing compounds can also be employed. Stabilizers can have a molecular weight greater than or equal to 300. In some embodiments, phosphorus containing stabilizers with a molecular weight greater than or equal to 500 are useful. Flow aids and mold release compounds are also contemplated. When present, the total amount of organic additive is more than 0 to 5 percent by weight, based on the combined weight of the polymer components. In some embodiments, the composition contains no additives.

Heat stabilizer additives include organophosphites (e.g. triphenyl phosphite, tris-(2,6-dimethylphenyl)phosphite, tris-(mixed mono- and di-nonylphenyl)phosphite or the like), phosphonates (e.g. dimethylbenzene phosphonate or the like), phosphates (e.g., trimethyl phosphate, or the like), or combinations comprising at least one of the foregoing heat stabilizers. The heat stabilizer can comprise tris(2,4-di-t-butylphenyl) phosphate available as IRGAPHOS™ 168. The heat stabilizer can also comprise pentaerythritol-tetrakis-(3-laurylthiopropionate). Heat stabilizers, when present, are generally used in amounts of 0.01 to 5 weight percent, or more specifically, 0.1 to 5 weight percent, based on the combined weight of the polymer components.

The thermoplastic composition can include a hindered phenolic stabilizer additive. Examples of the above compounds include 2,6-di-t-butyl-p-cresol, 2,2'-methylenebis(4-methyl-6-t-butylphenol), 4,4'-methylenebis(2,6-di-t-butylphenol), 1,1,3-tris(2-methyl-4-hydroxy-5-t-butylphenyl) butane, 4,4'-butylidenebis(3-methyl-6-t-butylphenol), 1,3-5-trimethyl-2-4,6-tris(3,5-di-t-butyl-4-hydroxybenzyl) benzene, 4,4'-thiobis(3-methyl-6-t-butylphenol), n-octadecyl-3-(4'-hydroxy-3',5'-di-t-butylphenyl)propionate, n-octadecyl-2-(4'-hydroxy-3',5'-di-t-butylphenyl)propionate, 1,6-hexanediol-bis[3-(3,5-di-t-butyl-4-hydroxphenyl)propionate], ethylenebis(oxyethylene)bis-[3-(5-tert-butyl-4-hydroxy-m-tryl) propionate], pentaerythritol tetrakis[3-(3,5-di-t-butyl-4-hydroxyphenyl)propionate], 3,9-bis[2-(3-(3-t-butyl-4-hydroxy-5-methylphenyl)-propionyloxy)-1,1-dimethylethyl]-2,4,8,10-tetraoxaspiro-[5,5]undecane, butyl-6-(3'-t-butyl-5'-methyl-2'-hydroxybenzyl)-4-methylphenylacrylate, 2-[1-(2-hydroxy-3,5-di-t-pentylphenyl)ethyl]-4,6-di-t-pentylphenylacrylate, di-n-octadecyl-3,5-di-t-butyl-4-hydroxybenzylphosphonate, N,N'-hexamethylenebis-(3,5-di-t-butyl-4-hydroxy-dihydrocinnamamide, N,N'-ethylenebis[3-(3,5-di-t-butyl-4-hydroxyphenyl)-propionamide], N,N'-tetramethylenebis[3-(3,5-di-t-butyl-4-hydroxyphenyl)-propionamide], N,N'-hexamethylenebis[3-(3,5-di-t-butyl-4-hydroxyphenyl) propionamide], N,N'-ethylenebis[3-(3-t-butyl-5-methyl-4-hydroxyphenyl)-propionamide], N,N'-hexamethylenebis-[3-(3-t-butyl-5-methyl-4-hydroxyphenyl)propionamide], N,N'-bis[3-(3,5-di-t-butyl-4-hydroxyphenyl)propionyl] hydrazine, N,N'-bis[3-(3-t-butyl-5-methyl-4-hydroxphenyl) propionyl]-hydrazine, 1,3,5-tris(3,5-di-t-butyl-4-hydroxybenzyl)isocyanurate, 1,3,5-tris(4-t-butyl-3-hydroxy-2,6-dimethylbenzyl)-isocyanurate, triethylene glycol bis(3-tert-butyl-4-hydroxy-5-methylphenyl)propionate, and the like. The hindered phenolic compounds can be used alone or in a combination comprising at least one of the foregoing. In an exemplary embodiment, the hindered phenolic stabilizer is pentaerythritol tetrakis[3-(3,5-di-t-butyl-4-hydroxyphenyl) propionate], available under the trade name IRGANOX 1010 from BASF. When present, the hindered phenolic stabilizer can be used in amounts of 0.01 to 5 weight percent, or more specifically, 0.1 to 5 weight percent, based on the combined weight of the polymer components.

In some embodiments, the composition comprises 0.1 to 1 weight percent of a hindered phenol, such as 2',3-bis[3-[3,5-di-tert-butyl-4-hydroxyphenyl]propionyl]proponiohydrazine sold under the trade name IRGANOX MD 1024 by BASF, as a metal deactivator. In some embodiments, the composition comprises 0.1 to 1 weight percent of an epoxy-functionalized styrene-acrylic copolymer, sold as Joncryl ADR 4368-F from BASF, for enhanced chemical resistance. In some embodiments, the composition comprises sodium salts of linear $C_{24}$-$C_{36}$ monocarboxylic acids, such as the sodium salt of montanic acid, sold as Licomont NaV101 from Clariant GmbH, as a nucleating agent.

The composition can optionally comprise a flame retardant additive, where, in an embodiment, the flame retardant additive can comprise aluminum phosphinate. Suitable aluminum phosphinates include, but are not limited to, Exolit OP available from Clariant, such as Exolit OP1240. When present, the flame retardant additive can be in an amount less than 10 weight percent. In an exemplary embodiment, the flame retardant additive is present in an amount less than or equal to 8 weight percent, based on the total weight of the composition.

The blends can optionally further contain fillers and reinforcements for example fiber glass, milled glass, glass beads, carbon black, glass flake, and the like. Minerals such as talc, wollastonite, titanium dioxide, mica, kaolin or montmorillonite clay, silica, quartz, barite, and combinations of at least one of the foregoing can be added. The compositions can comprise inorganic fillers, such as, for example, carbon fibers and nanotubes, metal fibers, metal powders, conductive carbon black, and other additives including nano-scale reinforcements as well as combinations of inorganic fillers. In some embodiments, when present, the thermoplastic composition comprises 0.5 to 5 weight percent of talc, silica, titanium dioxide, carbon black, or a combination of at least one of the foregoing, where weight percent is based on the combined weight of the polymer components.

The thermoplastic composition can be prepared by melt-mixing or a combination of dry blending and melt-mixing. Melt-mixing can be performed in single or twin screw type extruders or similar mixing devices which can apply a shear and heat to the components. Melt-mixing can be performed at temperatures greater than or equal to the melting temperatures of the polymer components and less than the degradation temperatures of either of the polymer components.

All of the ingredients can be added initially to the processing system. In some embodiments, the ingredients can be added sequentially or through the use of one or more master batches. It can be advantageous to apply a vacuum to the melt through one or more vent ports in the extruder to remove volatile impurities in the composition. In some embodiments the composition is the product of melt-mixing the polymers and, when present, any additives.

In an exemplary embodiment, compounding is performed using a Toshiba TEM-37BS twin screw extruder. The compositions can be injection molded using a Nissei ES3000-25E injection molding machine following drying of the compounded pellets.

Before coating onto a conductor wire as described below, the thermoplastic compositions can have a desirable combination of properties, such properties being determined in the absence of the conductor wire. For example it is desirable for the thermoplastic composition to have a melt flow rate (MFR) of 5 to 150 grams per 10 minutes (g/10 min), or 7 to 125 g/10 min, or 9 to 110 g/10 min, or 10 to 100 g/10 min, measured at 290° C. and a load of 5 kilograms according to ASTM D1238.

The thermoplastic composition can have a flexural modulus of 150 to 1600 megaPascals (MPa), or 350 to 1600 MPa as determined by ASTM D790 at 3.2 millimeters.

The thermoplastic composition can have a flexural strength of greater than 15 MPa, or 20 to 75 MPa, or 35 to 65 MPa, determined according to ASTM D790.

The thermoplastic composition can have a tensile modulus of greater than 100 MPa, or greater than 500 MPa, or 500 MPa to 1500 MPa, determined according to ASTM D638.

The thermoplastic composition can have a tensile elongation at break of greater than or equal to 0% as determined by ASTM D638. The elongation at break can be less than or equal to 500%. Specifically, the tensile elongation at break can be greater than 0% and less than or equal to 300%.

The thermoplastic composition can have tensile stress at break of greater than or equal to 20 MPa, for example 25 to 50 MPa as determined by ASTM D638.

The thermoplastic composition can have a Shore D hardness of greater than 50, for example a Shore D hardness of 51 to 80, as determined according to ASTM D1238.

The thermoplastic composition can have a tear strength of greater than 5 N/mm, or greater than 10 N/mm, or greater than 20 N/mm, for example up to 50 N/mm, determined according to ISO 34-1.

In some embodiments the thermoplastic composition is extruded or otherwise molded to form an article such as a tube or a coated wire.

A coated wire comprises a conductor wire and a covering disposed over the conductor wire. The covering comprises the previously described thermoplastic composition. The composition is applied to the conductor wire by a suitable method such as extrusion coating to form a coated wire. For example, a coating extruder equipped with a screw, crosshead, breaker plate, distributor, nipple, and die can be used. The melted thermoplastic composition forms a covering disposed over a circumference of the conductor wire. Extrusion coating can employ a single taper die, a double taper die, other appropriate die or combination of dies to position the conductor wire centrally and avoid die lip build up.

In some embodiments it can be useful to dry the thermoplastic composition before extrusion coating. Exemplary drying conditions are 60 to 90° C. for 2 to 20 hours.

In some embodiments, during extrusion coating, the thermoplastic composition is melt filtered, prior to formation of the coating, through one or more filters. In some embodiments the thermoplastic composition has substantially no particulates greater than 80 micrometers in size, or any particulates present will be less than or equal to 40 micrometers in size. In some embodiments there will be substantially no particulates greater than 20 micrometers in size. The presence and size of particulates can be determined using a solution of 1 gram of thermoplastic composition dissolved in 10 milliliters of a suitable solvent and analyzing it using microscopy or light scattering techniques. Substantially no particulates is defined as having less than or equal to 3 particulates, or, more specifically, less than or equal to 2 particulates, or, even more specifically, less than or equal to 1 particulate per one gram sample. Low levels of particulates are beneficial for giving a layer of insulation on a coated wire that will not have electrically conductive defects as well as providing coatings with improved mechanical properties.

The extruder temperature during extrusion coating is generally less than the degradation temperature of the block copolymers. Additionally the processing temperature is adjusted to provide a sufficiently fluid molten composition to afford a covering for the conductor wire, for example, higher than the softening point of the thermoplastic composition, or more specifically at least 30° C. higher than the melting point of the thermoplastic composition.

After extrusion coating the coated wire is usually cooled using a water bath, water spray, air jets or a combination comprising one or more of the foregoing cooling methods. Exemplary water bath temperatures are 20 to 90° C., or, more specifically, 80 to 90° C.

In some embodiments, the composition is applied to the conductor wire to form a covering disposed over and in physical contact with the conductor wire. Additional layers can be applied to the covering. Any methods of coating a conductor wire that are generally known can be used. In some embodiments the composition is applied to a conductor wire having one or more intervening layers between the conductor wire and the covering to form a covering disposed over the conductor wire. For instance, an optional adhesion promoting layer can be disposed between the conductor wire and covering. In another example, the conductor wire can be coated with a metal deactivator prior to applying the covering. Alternatively, a metal deactivator can be mixed with the thermoplastic composition. In another example the intervening layer comprises a thermoplastic or thermoset composition that, in some cases, is foamed.

The conductor wire can comprise a single strand or a plurality of strands. In some cases, a plurality of strands can be bundled, twisted, braided, or a combination of the foregoing to form a conductor wire. Additionally, the conductor wire can have various shapes such as round or oblong. Suitable materials for the conductor wires include, but are not limited to, copper, aluminum, lead, gold, silver, iron, nickel, chromium, and alloys comprising at least one of the foregoing metals. In an exemplary embodiment, the conductor wire is copper. The conductor wire can also comprise a coating, which can include, for example, tin, gold or silver. In some embodiments the conductor wire comprises optical fibers.

The cross-sectional area of the conductor wire and thickness of the covering can vary and is typically determined by the desired application for the coated wire. The coated wire can be used as coated wire without limitation, including, for example, for harness wire for automobiles, wire for household electrical appliances, wire for electric power, wire for instruments, wire for information communication, wire for electric cars, as well as ships, airplanes, and the like. Specific applications that can benefit from coated electrical wires comprising the thermoplastic composition are those requiring high-heat, thin-walled wire coatings, for example for high-heat train, automobile, and aircraft applications. In some specific embodiments, an article can comprise the electrical wire having a covering comprising the thermoplastic composition, wherein the article is a railway vehicle component, an automobile component, or an aircraft component.

In some embodiments the covering can have a thickness of 0.01 to 10 millimeters (mm) or, more specifically, 0.05 to 5 mm, or, even more specifically 0.1 to 1 mm.

Multiple coated wires can be combined to form a cable. The cable can comprise additional protective elements, structural elements, or a combination thereof. An exemplary protective element is a jacket which surrounds the group of coated wires. The jacket and the covering on the coated wires, singly or in combination, can comprise the thermoplastic composition described herein. A structural element is a typically non-conductive portion which provides additional stiffness, strength, shape retention capability or the like.

The poly(etherimide-siloxane) thermoplastic compositions provided are cost-effective, and demonstrate improved physical properties, including low flammability, high temperature stability, low flexural modulus, high tensile elongation, and in some embodiments high tear strength. Therefore, a substantial improvement in thermoplastic compositions for use as electrical wire coatings is provided.

For example, the thermoplastic compositions coating the conductor wires can have a tensile stress of greater than or equal to 20 MPa, for example 20 to 80 MPa, determined according to UL-1581 after 24 hours at 23° C.

The thermoplastic compositions coating the conductor wires can have a tensile elongation of greater than 10%, greater than 100%, for example up to 300%, determined according to UL-1581 after 24 hours at 23° C.

The thermoplastic compositions coating the conductor wires can have a tensile stress of greater than or equal to 20 MPa, for example 20 to 75 MPa, determined according to UL-1581 after heat aging for 168 hours at 158° C.;

The thermoplastic compositions coating the conductor wires can have a tensile elongation of greater than 10%, greater than 100%, for example up to 300%, determined according to UL-1581 after heat aging for 168 hours at 158° C.;

The thermoplastic compositions coating the conductor wires can have a tensile stress of greater than or equal to 20 MPa, for example 20 to 75 MPa, determined according to UL-1581 after heat aging for 168 hours at 180° C.

The thermoplastic compositions coating the conductor wires can have a tensile elongation of greater than 10%, greater than 100%, for example up to 300%, determined according to UL-1581 after heat aging for 168 hours at 180° C.

The thermoplastic compositions coating the conductor wires can have a tear strength of greater than 20 N/mm, determined according to ISO 34-1 in the presence of the conductor wire The electrical wire achieves a pass rating in the single wire vertical flame propagation test conducted according to EN50265-2-1/IEC60332-1, and preferably also achieves a pass rating in the single wire burn test conducted according to UL-1581.

Further information is provided by the following non-limiting examples.

EXAMPLES

Materials for the following examples are listed in Table 1.

TABLE 1

| Abbreviation | Chemical Description (Trade Name or use) | Source |
|---|---|---|
| STM1500 | Polyetherimide dimethylsiloxane copolymer, siloxane content 40 wt % (SILTEM ™) | SABIC |
| STM1700 | Polyetherimide dimethylsiloxane copolymer, siloxane content 20 wt % (SILTEM ™) | SABIC |
| PBT | Polybutylene Terephthalate (Longlite ® PBT 1100-211 X) | Chang Chun Plastics Co., Ltd. |
| PET-1 | Polyethylene Terephthalate (BG801) | SINOPEC YiZheng Chemical Fibre Co. |
| PET-2 | Polyethylene Terephthalate (BG80) | SINOPEC YiZheng Chemical Fibre Co. |
| PET-3 | Polyethylene Terephthalate (BG-03-80) | Foshan Honghua Polyester Chip Co. |
| PEN-1 | Polyethylene Naphthalate, IV = 0.65 dL/g | Futura Polyesters Ltd. |
| PEN-2 | Polyethylene Naphthalate, IV = 0.75 dL/g | Futura Polyesters Ltd. |
| PCE | Polyester-carbonate copolymer; Mw = 28,350 Daltons; 60% ester content | SABIC |
| ITR-PC | (Isophthalate-terephthalate-resorcinol)-co-polycarbonate; Mw = 20,000 Daltons; 82% ITR; para-cumyl phenol end-capped | SABIC |
| PCT-1 | Poly(1,4-cyclohexanedimethylene terephthalate) (PURATAN PCT) | SK Chemicals Co., Ltd. |
| PCT-2 | Poly(1,4-cyclohexanedimethylene terephthalate) | Eastman Chemical Corporation |
| TPEE-1 | Thermoplastic Polyester Elastomer (HYTREL 7246) | Du Pont China Holding Co., Ltd. |
| TPEE-2 | Thermoplastic Polyester Elastomer (HYTREL 5555HS) | Du Pont China Holding Co., Ltd. |
| TPEE-3 | Thermoplastic Polyester Elastomer (HYTREL 5556 NAT) | Du Pont China Holding Co., Ltd. |
| IR1010 | Benzenepropanoic acid, 3,5-bis(1,1-dimethylethyl)-4-hydroxy-, 1,1'-[2,2-bis[[3-[3,5-bis(1,1-dimethylethyl)-4-hydroxyphenyl]-1-oxopropoxy]methyl]-1,3-propanediyl] ester (Irganox ® 1010, hindered phenolic stabilizer) | BASF |

TABLE 1-continued

| Abbreviation | Chemical Description (Trade Name or use) | Source |
|---|---|---|
| Irgafos 168 | Tris(2,4-di-tert-butylphenyl) phosphite (phosphite stabilizer) | Ciba Specialty Chemicals |
| Seenox 412S | Pentaerythritol-tetrakis-(3-laurylthiopropionate) (heat stabilizer) | Shipro Kasei Kaisha, Ltd. |
| IR1024 | Benzenepropanoic acid, 3,5-bis(1,1-dimethylethyl)-4-hydroxy-2-[3-[3,5-bis(1,1-dimethylethyl)-4-hydroxyphenyl]-1-oxopropyl]hydrazide (Irganox ® MD 1024, metal deactivator) | BASF |
| ADR | Epoxy-functionalized styrene-acrylate copolymer (Joncryl ® ADR 4368-F, hydrolytic stabilizer) | BASF |
| NAV 101 | Sodium salt of montanic acid (linear, aliphatic $C_{24}$-$C_{36}$ monocarboxylic acid) (Licomont NaV 101, nucleating agent) | Clariant GmbH |
| Talca | Talc filler (Microtuff ® AG 609) (filler) | Connell Bros. (Shanghai) Co., Ltd. |
| Epoxy-EEA | Ethylene-ethyl-acrylate copolymer(Epoxy EEA Concentrate) | SABIC |
| Exolit | Aluminum diethyl phosphinic acid (Exolit OP 1240) | Clariant GmbH |

The compositions of the following examples were prepared by compounding on a Toshiba TEM-37BS twin screw extruder, and chopped into pellets following cooling in a water bath at 80-90° C. Prior to injection molding, the pellets were dried in an oven. The compounding profile used to prepare the compositions is shown below in Table 2.

TABLE 2

| Parameters | Unit | Set Values |
|---|---|---|
| Zone 1 Temp | ° C. | 50 |
| Zone 2 Temp | ° C. | 180 |
| Zone 3 Temp | ° C. | 250 |
| Zone 4 Temp | ° C. | 290 |
| Zone 5 Temp | ° C. | 290 |
| Zone 6 Temp | ° C. | 290 |
| Zone 7 Temp | ° C. | 290 |
| Zone 8 Temp | ° C. | 290 |
| Zone 9 Temp | ° C. | 290 |
| Zone 10 Temp | ° C. | 290 |
| Zone 11 Temp | ° C. | 290 |
| Die Temp | ° C. | 290 |
| Screw speed | rpm | 400 |
| Throughput | kg/hr | 30 |

Articles suitable for physical testing were prepared by injection molding. The injection molding profile on the Nissei ES3000-25E injection molding machine used to prepare the articles is provided in Table 3.

TABLE 3

| Parameters | Unit | Set Values |
|---|---|---|
| Cnd: Pre-drying time | Hour | 6 |
| Cnd: Pre-drying temp | ° C. | 80 |
| Hopper temp | ° C. | 50 |
| Zone 1 temp | ° C. | 265 |
| Zone 2 temp | ° C. | 280 |
| Zone 3 temp | ° C. | 280 |
| Nozzle temp | ° C. | 285 |
| Mold temp | ° C. | 80 |
| Screw speed | rpm | 100 |
| Back pressure | kgf/cm$^2$ | 90 |
| Decompression | mm | 6 |
| Injection time | s | 2 |
| Holding time | s | 8 |
| Cooling time | s | 20 |
| Shot volume | mm | 58 |
| Switch point (mm) | mm | 10 |
| Injection speed (mm/s) | mm/s | 25 |
| Holding pressure | kgf/cm$^2$ | 600 |
| Cushion | mm | 4 |

Coated wire samples were also prepared, where the coating comprises the thermoplastic composition described above. The samples were prepared using a WTL EXL50 extrusion coating machine. The wire used was American Wire Gauge (AWG) 24 copper conductor wire. The wire was pre-heated at 120 to 140° C. and subsequently extrusion coated with the thermoplastic composition at a temperature of 290° C., followed by hot water cooling at a temperature of 80-90° C. The line speed was 50-100 m/min.

Physical testing of the compositions and the coated wires was conducted according to the standards summarized in Table 4. Unless indicated otherwise, all tests are the tests in effect in the year 2010.

TABLE 4

| Property | Test Standard | Specimen Type | Units |
|---|---|---|---|
| ASTM Flexural Test (Flex. modulus and flex. strength) | ASTM D790 | Bar - 127 × 12.7 × 3.2 mm | MPa |
| ASTM Filled Tensile Test (Tens. modulus, strength, and elongation) | ASTM D638 | ASTM Type I Tensile bar | MPa, % |
| Shore D Hardness | ASTM D2240 | Overlap 2 Color chips 80 × 50 × 3.2 mm | |
| Tear strength | ISO 34-1 | Bar - 127 × 12.7 × 1.6 mm | N/mm |
| Melt Flow Rate (MFR) | ASTM D1238 | Pellets | g/10 min |
| Wire Tensile test (tensile stress and tens. elongation) | UL-1581 | Single wire | MPa, % |
| Single wire burn test (VW-1, 1C) | UL-1581 | Single wire | |
| Single wire vertical flame propagation test (VDE) | EN50265-2-1/IEC60332-1 | Single wire | |

For each of Examples 1-35, the polymer components and any additives were melt-mixed in the amounts shown in Tables 5A and 5B, extruded, and the compositions were characterized as described above. Results are also shown in Tables 5A and 5B.

The physical properties of coated wires were characterized following extrusion of the compositions to form a covering disposed on the surface of a copper conductor wire. The results of the wire property tests are provided in Tables 6A and 6B.

Specific examples are discussed below.

Example 1

As a comparative example, a composition comprising only poly(etherimide-siloxane) copolymer was tested. The block copolymer has a siloxane content of 40 weight percent relative to the weight of the block copolymer. The poly(etherimide-siloxane) block copolymer showed good tensile elongation of the coated wire sample, which was greater than 100% at room temperature (about 23° C.). Excellent aging performance was also observed, with the coated wire sample having good tensile elongation retention after aging at 158° C. and 180° for 160 hours. The coated wire sample also passed both VW-1 and VDE flame tests, indicative of the excellent flame retardant properties of Siltem. Example 1 showed very poor tear strength of 11.06 N/mm. Example 1 thus demonstrates the continuing need in the art for poly(etherimide-siloxane)-containing compositions suitable for high-heat wire coating applications, specifically compositions having high tear strength while retaining tensile strength, flexural modulus, flame retardant properties, and heat aging performance associated with poly(etherimide-siloxane)-containing compositions.

Examples 2-11

Examples 2-11 are compositions comprising poly(etherimide-siloxane) block copolymer blended with polyester, specifically, polyethylene terephthalate (PET) or polybutylene terephthalate (PBT). The addition of the polyester component in the blend resulted in improved stiffness, tensile stress, tensile elongation, and tear strength. However, the compositions exhibited slightly lower heat aging performance. Generally, the examples showed improved tensile elongation and improved tear strength at room temperature, compared to the results of example 1. Poor tensile elongation retention was observed after aging at 158° C. and 180° C. for 160 hours.

The polyester loading was varied in the blends, for example PET was varied from 20 to 50 weight percent across examples 2-5. It was found that the stiffness of the blends, specifically the modulus, stress, and hardness, was enhanced by increasing the PET loading. Tensile elongation and tear strength also improved with increased PET loading.

Examples 5-8 comprise equal parts poly(etherimide-siloxane) block copolymer and PET, with varying additives. In general, comparable mechanical and thermal properties were observed for these examples, although the hydrostability under heat aging of the samples were significantly improved when epoxy EEA Concentrate was used (Example 8) compared to Joncryl ADR 4368 (Examples 5 and 7). Examples 2-8 were further all able to pass VDE flame retardant tests. For VW-1 testing, however, only samples having PET loading lower than 30 weight percent (Examples 2 and 3) passed. Examples 9 and 10 use PET from a different source, and comparable results to Examples 2-8 were obtained. Example 11 incorporated PBT rather than PET, and the results were comparable to compositions comprising PET.

Examples 12-15

Examples 12-15 are poly(etherimide-siloxane) copolymer blends with thermoplastic polyester elastomers (TPEE) where the loading of TPEE was adjusted from 10 to 40 weight percent. The thermoplastic compositions exhibited enhanced tensile elongation and tear strength with increased TPEE loading. However lower stiffness was also noted, specifically lower

TABLE 5A

|  | Units | 1* | 2 | 3 | 4 | 5 | 6 | 7 | 8 | 9 |
|---|---|---|---|---|---|---|---|---|---|---|
| Component |  |  |  |  |  |  |  |  |  |  |
| STM1500 | wt % | 100 | 80 | 70 | 60 | 50 | 50 | 50 | 50 | 50 |
| STM1700 | wt % |  |  |  |  |  |  |  |  |  |
| PBT | wt % |  |  |  |  |  |  |  |  |  |
| PET-1 | wt % |  | 20 | 30 | 40 | 50 | 50 | 50 | 50 |  |
| PET-2 | wt % |  |  |  |  |  |  |  |  | 50 |
| PET-3 | wt % |  |  |  |  |  |  |  |  |  |
| PEN-1 | wt % |  |  |  |  |  |  |  |  |  |
| PEN-2 | wt % |  |  |  |  |  |  |  |  |  |
| PCE | wt % |  |  |  |  |  |  |  |  |  |
| ITR-PC | wt % |  |  |  |  |  |  |  |  |  |
| PCT-1 | wt % |  |  |  |  |  |  |  |  |  |
| PCT-2 | wt % |  |  |  |  |  |  |  |  |  |
| TPEE-1 | wt % |  |  |  |  |  |  |  |  |  |
| TPEE-2 | wt % |  |  |  |  |  |  |  |  |  |
| TPEE-3 | wt % |  |  |  |  |  |  |  |  |  |
| Irganox 1010 | wt % |  | 0.8 | 0.8 | 0.8 | 0.8 |  | 0.8 | 0.8 | 0.8 |
| Irgafos 168 | wt % |  | 0.5 | 0.5 | 0.5 | 0.5 |  | 0.5 | 0.5 | 0.5 |
| Seenox 412S | wt % |  | 0.5 | 0.5 | 0.5 | 0.5 |  | 0.5 | 0.5 | 0.5 |
| Irganox 1024 | wt % |  | 0.5 | 0.5 | 0.5 | 0.5 |  | 0.5 | 0.5 | 0.5 |
| ADR | wt % |  | 0.5 | 0.5 |  | 0.5 | 0.5 | 0.5 |  | 0.5 |
| NAV 101 | wt % |  |  |  |  |  |  | 0.5 |  |  |
| Talc | wt % |  |  |  |  |  |  |  |  |  |
| Epoxy EEA | wt % |  |  |  |  | 2 |  |  | 2 |  |
| Exolit | wt % |  |  |  |  |  |  |  |  |  |

TABLE 5A-continued

| Properties | | | | | | | | | | |
|---|---|---|---|---|---|---|---|---|---|---|
| Flex. Modulus | MPa | 327 | 522 | 627 | 828 | 1010 | 1150 | 1130 | 987 | 1010 |
| Flex. Stress | MPa | 10.4 | 15.6 | 21 | 32.3 | 40 | 47 | 41.9 | 42.2 | 40.1 |
| Shore D | — | 58.7 | 61.1 | 63.1 | 65.9 | 69.9 | 71.2 | 68.7 | 68.4 | 69.4 |
| Tens. Modulus | MPa | 419.6 | 835.4 | 999.6 | 1099.6 | 1316.2 | 1333 | 1271.2 | 1256.6 | 1298.4 |
| Tens. Stress | MPa | 19.5 | 27.7 | 31.4 | 26.3 | 37.3 | 29.2 | 19.8 | 41.1 | 36.7 |
| Tens. Elong. | % | 51.97 | 107.2 | 161.4 | 137.8 | 223.96 | 186 | 171.2 | 279.6 | 209.22 |
| MFR | g/10 min | 21.7 | 23.3 | 32.8 | 31 | 32 | 4.08 | 14.3 | 55.9 | 48.4 |
| Tear strength | N/mm | 14.01 | 10.63 | 11.01 | 31.2 | 37.37 | 40.6 | 32.8 | 32 | 35.4 |

| | Units | 10 | 11 | 12 | 13 | 14 | 15 | 16 | 17 | 18 |
|---|---|---|---|---|---|---|---|---|---|---|
| Component | | | | | | | | | | |
| STM1500 | wt % | 50 | 50 | 90 | 80 | 70 | 60 | 50 | 50 | 50 |
| STM1700 | wt % | | | | | | | | | |
| PBT | wt % | | 50 | | | | | | | |
| PET-1 | wt % | | | | | | | | | |
| PET-2 | wt % | | | | | | | | | |
| PET-3 | wt % | 50 | | | | | | | | |
| PEN-1 | wt % | | | | | | | 50 | | |
| PEN-2 | wt % | | | | | | | | 50 | |
| PCE | wt % | | | | | | | | | 50 |
| ITR-PC | wt % | | | | | | | | | |
| PCT-1 | wt % | | | | | | | | | |
| PCT-2 | wt % | | | | | | | | | |
| TPEE-1 | wt % | | | | | | | | | |
| TPEE-2 | wt % | | | | | | | | | |
| TPEE-3 | wt % | | | 10 | 20 | 30 | 40 | | | |
| Irganox 1010 | wt % | 0.8 | 0.8 | | | | | 0.8 | 0.8 | 0.8 |
| Irgafos 168 | wt % | 0.5 | 0.5 | 0.5 | 0.5 | 0.5 | 0.5 | 0.5 | 0.5 | 0.5 |
| Seenox 412S | wt % | 0.5 | 0.5 | | | | | 0.5 | 0.5 | 0.5 |
| Irganox 1024 | wt % | 0.5 | 0.5 | | | | | 0.5 | 0.5 | 0.5 |
| ADR | wt % | 0.5 | 0.5 | | | | | 0.5 | 0.5 | 0.5 |
| NAV 101 | wt % | | | | | | | | | |
| Talc | wt % | | | | | | | | | |
| Epoxy EEA | wt % | | | | | | | | | |
| Exolit | wt % | | | | | | | | | |
| Properties | | | | | | | | | | |
| Flex. Modulus | MPa | 1060 | 1070 | 333 | 291 | 275 | 227 | 923 | 946 | 1160 |
| Flex. Stress | MPa | 41.6 | 43.3 | 12.1 | 10.9 | 10.8 | 9.74 | 36.2 | 36.6 | 61.2 |
| Shore D | — | 70.4 | 70.9 | 57.4 | 56.7 | 56.1 | 54.6 | 70.5 | 71 | 76.1 |
| Tens. Modulus | MPa | 1331.6 | 1289.6 | 223.25 | 203.4 | 169.2 | 149.8 | 1227.2 | 1167.8 | 1482.6 |
| Tens. Stress | MPa | 38.4 | 33.4 | 22.3 | 22.6 | 23.7 | 24.3 | 29.9 | 31.8 | 39.7 |
| Tens. Elong. | % | 229.42 | 152.5 | 113.6 | 156.6 | 213.7 | 274.5 | 13.6 | 10.6 | 27.9 |
| MFR | g/10 min | 33.2 | 123 | 5.66 | 9.55 | 14.6 | 23.1 | 12 | 10.1 | 16.1 |
| Tear strength | N/mm | 37.51 | 30.2 | 15.98 | 14.75 | 19.46 | 22.31 | 5.1 | 5.3 | 28.6 |

*Comparative Example

TABLE 5B

| | | Examples | | | | | | | | |
|---|---|---|---|---|---|---|---|---|---|---|
| | Units | 19 | 20 | 21 | 22 | 23 | 24 | 25 | 26 | 27 |
| STM1500 | wt % | 50 | 60 | 50 | 80 | 70 | 60 | 60 | 60 | 60 |
| STM1700 | wt % | | | | | | | | | |
| PBT | wt % | | | | | | | | | |
| PET-1 | wt % | | | | | | | | | |
| PET-2 | wt % | | | | | | | | | |
| PET-3 | wt % | | | | | | | | | |
| PEN-1 | wt % | | | | | | | | | |
| PEN-2 | wt % | | | | | | | | | |
| PCE | wt % | | | | | | | | | |
| ITR-PC | wt % | | 40 | 50 | | | | | | |
| PCT-1 | wt % | 50 | | | | | | | | |
| PCT-2 | wt % | | | | 20 | 30 | 40 | 40 | 30 | 30 |
| TPEE-1 | wt % | | | | | | | | | |
| TPEE-2 | wt % | | | | | | | | 10 | 10 |
| TPEE-3 | wt % | | | | | | | | | |
| Irganox 1010 | wt % | 0.8 | 0.8 | 0.8 | 0.8 | 0.8 | 0.8 | 0.8 | 0.8 | 0.8 |
| Irgafos 168 | wt % | 0.5 | 0.5 | 0.5 | 0.5 | 0.5 | 0.5 | 0.5 | 0.5 | 0.5 |
| Seenox 412S | wt % | 0.5 | 0.5 | 0.5 | 0.5 | 0.5 | 0.5 | 0.5 | 0.5 | 0.5 |
| Irganox 1024 | wt % | 0.5 | 0.5 | 0.5 | 0.5 | 0.5 | 0.5 | 0.5 | 0.5 | 0.5 |
| ADR | wt % | 0.5 | | | 0.5 | 0.5 | 0.5 | 0.5 | 0.5 | 0.5 |

TABLE 5B-continued

|  | Units |  |  |  |  |  |  |  |  |
|---|---|---|---|---|---|---|---|---|---|
| NAV 101 | wt % |  |  |  |  |  |  |  |  |
| Talc | wt % |  |  |  |  |  |  | 0.5 | 0.5 |
| Epoxy EEA | wt % | 2 | 2 |  |  |  |  |  |  |
| Exolit | wt % |  |  |  |  |  |  |  |  |
| Properties |  |  |  |  |  |  |  |  |  |
| Flex. Modulus | MPa | 910 | 1030 | 1110 | 558 | 695 | 845 | 873 | 620 | 649 |
| Flex. Stress | MPa | 41.5 | 42.2 | 47.8 | 20.4 | 28.4 | 37.6 | 38.2 | 28.1 | 28 |
| Shore D | — | 70.8 | 71.6 | 73.4 | 63.6 | 66.7 | 69.2 | 69.2 | 66.1 | 66.5 |
| Tens. Modulus | MPa | 1121 | 1311.2 | 1426.6 | 791.6 | 910.2 | 998.8 | 1001.8 | 818.5 | 825.4 |
| Tens. Stress | MPa | 43.4 | 36 | 33.9 | 29.7 | 31.1 | 37.8 | 40.5 | 35.4 | 34.5 |
| Tens. Elong. | % | 209.1 | 80.46 | 60.32 | 115 | 103.74 | 159.2 | 201.2 | 204 | 187.2 |
| MFR | g/10 min | 15.7 | 80.8 | 92.3 | 11.2 | 5.6 | 14.9 | 11.7 | 12.8 | 11.3 |
| Tear strength | N/mm | 30.3 | 24.2 | 22.2 | 9.16 | 8.13 | 24.96 | 22.71 | 22.89 | 22.68 |

| | | Examples | | | | | | | | |
|---|---|---|---|---|---|---|---|---|---|---|
| | Units | 28 | 29 | 30 | 31 | 32 | 33 | 34 | 35 | 36 |
| STM1500 | wt % | 50 | 50 | 40 | 40 | 50 | 40 | 50 |  | 42 |
| STM1700 | wt % |  |  |  |  |  |  |  | 50 |  |
| PBT | wt % |  |  |  |  |  |  |  |  |  |
| PET-1 | wt % |  |  |  |  | 40 | 50 | 40 | 40 | 40 |
| PET-2 | wt % |  |  |  |  |  |  |  |  |  |
| PET-3 | wt % |  |  |  |  |  |  |  |  |  |
| PEN-1 | wt % |  |  |  |  |  |  |  |  |  |
| PEN-2 | wt % |  |  |  | 20 |  |  |  |  |  |
| PCE | wt % |  |  | 40 | 40 |  |  |  |  |  |
| ITR-PC | wt % | 10 | 20 |  |  |  |  |  |  |  |
| PCT-1 | wt % |  |  | 20 |  |  |  |  |  |  |
| PCT-2 | wt % | 40 | 30 |  |  |  |  |  |  |  |
| TPEE-1 | wt % |  |  |  |  | 10 | 10 |  |  |  |
| TPEE-2 | wt % |  |  |  |  |  |  | 10 | 10 | 10 |
| TPEE-3 | wt % |  |  |  |  |  |  |  |  |  |
| Irganox 1010 | wt % | 0.8 | 0.8 | 0.8 | 0.8 | 0.8 | 0.8 | 0.8 | 0.8 | 0.8 |
| Irgafos 168 | wt % | 0.5 | 0.5 | 0.5 | 0.5 | 0.5 | 0.5 | 0.5 | 0.5 | 0.5 |
| Seenox 412S | wt % | 0.5 | 0.5 | 0.5 | 0.5 | 0.5 | 0.5 | 0.5 | 0.5 | 0.5 |
| Irganox 1024 | wt % | 0.5 | 0.5 | 0.5 | 0.5 | 0.5 | 0.5 | 0.5 | 0.5 | 0.5 |
| ADR | wt % |  |  | 0.5 | 0.5 | 0.5 | 0.5 |  |  |  |
| NAV 101 | wt % |  |  |  |  |  |  |  |  |  |
| Talc | wt % |  |  |  |  |  |  |  |  |  |
| Epoxy EEA | wt % | 1 | 1 |  |  |  |  | 1 | 1 | 1 |
| Exolit | wt % |  |  |  |  |  |  |  |  | 8 |
| Properties |  |  |  |  |  |  |  |  |  |  |
| Flex. Modulus | MPa | 1050 | 1100 | 1260 | 1200 | 970 | 1170 | 856 | 1480 | 1050 |
| Flex. Stress | MPa | 47.2 | 48.3 | 60.2 | 59.1 | 37.3 | 44.5 | 32.6 | 70.9 | 36.9 |
| Shore D | — | 71.3 | 72.2 | 76.8 | 77.8 | 67.9 | 70.5 | 66.2 | 77.7 | 68.7 |
| Tens. Modulus | MPa | 1189 | 1276 | 1508.8 | 1571 | 1160.8 | 1326.8 | 1064.6 | 1786.4 | 1306.4 |
| Tens. Stress | MPa | 41.2 | 38.8 | 42.4 | 33.1 | 34.1 | 32.5 | 30.9 | 36 | 27.1 |
| Tens. Elong. | % | 153.6 | 117 | 75.3 | 40.7 | 263.4 | 319 | 232 | 40.14 | 5.37 |
| MFR | g/10 min | 47.3 | 40.8 | 20.9 | 7.96 | 5.62 | 9.04 | 106 | 128 | 835 |
| Tear strength | N/mm | 34.5 | 32.5 | 37.8 | 22.2 | 30.1 | 47 | 40.8 | 52.5 | 30.7 |

TABLE 6A

| Wire Properties | Units | 1* | 2 | 3 | 4 | 5 | 6 | 7 | 8 | 9 |
|---|---|---|---|---|---|---|---|---|---|---|
| Tensile stress[1] | MPa | 24.22 | 30.92 | 33.11 | 36.5 | 34.19 | 33.48 | 28.48 | 34.19 | 34.81 |
| Tens. elongation[1] | % | 117.6 | 160.05 | 217.3 | 295.68 | 203.88 | 189.3 | 130.63 | 185.75 | 142.5 |
| Tensile stress[2] | MPa | 27.63 | 32.59 | 37.05 | 33.38 | 44.83 | 44.67 | 41.2 | 31.58 | 46.45 |
| Tens. elongation[2] | % | 113.18 | 73.78 | 81.85 | 170.98 | 29.9 | 47.7 | 49.7 | 151.45 | 27.53 |
| Tensile stress[3] | MPa | 25 | 33.49 | 34.25 | 32.82 | 48.2 | 49.04 | 35.02 | 33.14 | 49.07 |
| Tens. elongation[3] | % | 84.73 | 82.13 | 53.1 | 109.93 | 19.4 | 46.15 | 18.88 | 116.65 | 14.1 |
| VW-1 FR |  | Pass | Pass | Pass | Fail | Pass | Pass | Pass | Fail | Pass |
| VDE FR |  | Pass | Pass | Pass | Pass | Pass | Pass | Pass | Pass | Pass |
| Tear Strength | N/mm | 11.06 | 8.4 | 12.6 | 37.3 | 47.15 | 47.43 | 39.2 | 42.7 | 50.57 |

| Wire Properties | Units | 10 | 11 | 12 | 13 | 14 | 15 | 16 | 17 | 18 |
|---|---|---|---|---|---|---|---|---|---|---|
| Tensile stress[1] | MPa | 33.88 | 26.86 | 21.4 | 22.9 | 22.3 | 24.5 | 39.79 | 39.38 | 44.05 |
| Tens. elongation[1] | % | 146.28 | 209.58 | 128.3 | 158.9 | 212.5 | 250.4 | 41.88 | 47.5 | 71.6 |
| Tensile stress[2] | MPa | 45.44 | 38.32 | 23.6 | 23.8 | 26.7 | 27.6 | 49.9 | 47.9 | 48.44 |
| Tens. elongation[2] | % | 38.75 | 62 | 104.9 | 82.2 | 68.5 | 65.4 | 42 | 40.33 | 38.38 |
| Tensile stress[3] | MPa | 48.77 | 39.24 | 22.2 | 22.6 | 21.4 | 27.1 | 51.09 | 50.46 | Crack |
| Tens. elongation[3] | % | 14 | 52.73 | 67.1 | 44.2 | 38.7 | 21.4 | 26.43 | 26.65 | Crack |

TABLE 6A-continued

| | | | | | | | | | | |
|---|---|---|---|---|---|---|---|---|---|---|
| VW-1 FR | | Fail | Fail | Pass | Pass | Fail | Fail | Pass | Pass | Pass |
| VDE FR | | Pass | Pass | Pass | Pass | Pass | Pass | Pass | Pass | Pass |
| Tear Strength | N/mm | 47.54 | 32.4 | 15.6 | 14.2 | 25.3 | 32.4 | 6.9 | 9.5 | 36.1 |

*Comparative Example
[1] 23° C., 24 hours;
[2] 158° C., 168 hours;
[3] 180° C., 168 hours

TABLE 6B

| | | Examples | | | | | | | | |
|---|---|---|---|---|---|---|---|---|---|---|
| | Units | 19 | 20 | 21 | 22 | 23 | 24 | 25 | 26 | 27 |
| Tensile stress[1] | MPa | 34.18 | 33.66 | 37.18 | 33.61 | 36.11 | 42.97 | 38.86 | 35.74 | 35.22 |
| Tens. elongation[1] | % | 170.8 | 135.88 | 143 | 176.95 | 179.75 | 202.7 | 188.75 | 197.03 | 192.1 |
| Tensile stress[2] | MPa | 44.21 | 33.57 | 35.4 | 33.68 | 34.5 | 42.09 | 39.58 | 32.38 | 33.67 |
| Tens. elongation[2] | % | 30.98 | 93.4 | 41.48 | 120.83 | 82.4 | 101.23 | 53.35 | 95.75 | 94.68 |
| Tensile stress[3] | MPa | 44.91 | 31.22 | 34.17 | 32.28 | 35.73 | 41.99 | 39.91 | 32.8 | 33.12 |
| Tens. elongation[3] | % | 21.33 | 28.78 | 27.4 | 96.1 | 71.08 | 59.4 | 28.35 | 60.1 | 54.08 |
| VW-1 FR | | Fail | Pass | Pass | Pass | Fail | Fail | Fail | Fail | Fail |
| VDE FR | | Pass | Pass | Pass | Pass | Pass | Pass | Pass | Pass | Pass |
| Tear Strength | N/mm | 46.4 | 26.1 | 30.6 | 11.6 | 10.5 | 48.93 | 33.47 | 27.78 | 35.14 |

| | | Examples | | | | | | | | |
|---|---|---|---|---|---|---|---|---|---|---|
| | Units | 28 | 29 | 30 | 31 | 32 | 33 | 34 | 35 | 36 |
| Tensile stress[1] | MPa | 34.73 | 38.14 | 43.08 | 47.49 | 26.59 | 30.97 | 31.52 | 50.12 | 29.34 |
| Tens. elongation[1] | % | 160.23 | 69.53 | 120.73 | 128.3 | 259.2 | 106.05 | 232.78 | 16.33 | 12.08 |
| Tensile stress[2] | MPa | 46.57 | 49.43 | 71.13 | 50.44 | 38.45 | 43.48 | 39.65 | 59.02 | Crack |
| Tens. elongation[2] | % | 24.78 | 32.1 | 15.73 | 67.5 | 55.25 | 31.98 | 37.08 | 9.55 | Crack |
| Tensile stress[3] | MPa | 47.05 | 50.59 | Crack | 59.89 | 39.2 | 45.3 | 42.53 | 65.08 | Crack |
| Tens. elongation[3] | % | 17.38 | 21.25 | Crack | 32.18 | 17.5 | 11.83 | 27.35 | 10.28 | Crack |
| VW-1 FR | | Fail | Fail | Pass | Pass | Fail | Fail | Fail | Fail | Pass |
| VDE FR | | Pass | Pass | Pass | Pass | Pass | Pass | Pass | Pass | Pass |
| Tear Strength | N/mm | 28.7 | 35.2 | 45.9 | 43.1 | 55.3 | 70.2 | 49.1 | 45.6 | 6.2 |

*Comparative Example;
[1] 23° C., 24 hours;
[2] 158° C., 168 hours;
[3] 180° C., 168 hours modulus, stress, and hardness. The elongation of the coated wire samples showed improvement when TPEE loading was increased for the compositions tested at room temperature. After heat aging at 158° C. and 180° C. for 160 hours, the opposite effect was noted, with tensile elongation values decreasing with increased TPEE loading. Coated wire samples of examples 12-15 all passed the VDE flame retardant tests. Only examples having low TPEE loading, such as examples 12 and 13, were able to pass VW-1 testing.

Examples 16-21

Examples 16-21 comprise blends of poly(etherimide-siloxane) copolymer and high temperature polyesters, including polyethylene naphthalate (PEN), poly(1,4-cyclohexanemethylene terephthalate) (PCT), polycarbonate-esters (PCE), and (isophthalate-terephthalate-resorcinol)-polycarbonate copolymer (ITR-PC). Examples 16 and 17 are poly(etherimide-siloxane) copolymer blends with PEN using two different PEN sources (PEN-1 and PEN-2). Both examples 16 and 17 exhibited lower tensile elongation compared to examples 18-21, and a tear strength that was comparable to that of neat Siltem (example 1). Examples 16 and 17 exhibited excellent flame retardant properties, passing both flame tests (VDE and VW-1).

Example 18, a blend of poly(etherimide-siloxane) copolymer and PCE, showed improved tensile elongation and tear strength when compared to examples 16 and 17, as well as good flame retardant properties. However, the hydrostability of example 18 was poor, with the sample exhibiting cracking after heat aging.

Examples 19-31

Examples 19-21 are blends poly(etherimide-siloxane) copolymer with either PCT or ITR-PC. These samples showed good flexibility with high tensile elongation and improved tear strength. The coated wire samples of examples 19-21 also exhibited good tensile elongation at room temperature (>100%), and withstood heat aging at 158° C. and 180° C. for 160 hours, with a slight elongation reduction. Examples 19-21 also passed VDE FR testing, with examples 20 and 21 also passing the VW-1 FR test. Example 19 was unable to pass the VW-1 test.

Examples 22-31

Examples 22-24 are compositions prepared by blending poly(etherimide-siloxane) copolymer with PCT, varying PCT loading from 20 to 40 weight percent. Examples 22-24 showed good flexibility with good tensile elongation for coated wire applications. The stiffness of the compositions was observed to increase with increased PCT loading; specifically the modulus and stress were increased. The tensile elongation was greater than 100% at room temperature, and good retention was found after heat aging at 158° C. and 180° C. for 160 hours. The tear strength of examples 22 and 23 was poor, and comparable to that of neat Siltem (example 1), attributed to lower loading of PCT. Examples 22 and 23 were able to pass both VDE and VW-1 flame tests, and example 24 was able to pass only the VDE test.

Example 25 further comprises talc as a nucleating agent, which overall gave rise to similar properties as example 24, however poor tear strength and hydro-stability of example 25 were noted, in comparison to example 24.

Example 26 was similar to example 23, further comprising 10 weight percent TPEE. Example 27 was similar to example 26, but further comprised talc as a nucleating agent. The tensile elongation and tear strength of example 26 were markedly improved compared to example 23, with other physical properties largely remaining unchanged. Example 27 showed similar properties as example 26.

Examples 28 and 29 are blends comprising poly(etherimide-siloxane) copolymer, PCT, and ITR-PC. In general, properties including tensile elongation, tear strength, and flame retardant properties were comparable to the blends of poly(etherimide-siloxane) copolymer and PCT (example 19), however high stiffness and poor hydro-stability were noted.

Example 30 is a blend comprising poly(etherimide-siloxane) copolymer, PCT, and PCE. Example 30 showed good tensile elongation, tear strength, and flame retardant properties. The stiffness, including modulus and stress, was enhanced. Poor hydro-stability was noted in the coated-wire sample incorporating the composition of example 30, resulting in wire-cracking after heat aging.

Example 31 is a blend comprising poly(etherimide-siloxane) copolymer, PCT, and PEN. The composition of this example generally showed balanced performance across all properties, including tensile elongation, tear strength, flame retardant properties, and hydro-stability.

Examples 32-36

Examples 32-34 are poly(etherimide-siloxane) copolymer blends comprising PET and TPEE. Compared to the blends with PET (Examples 2-10), the incorporation of 10 wt % TPEE in examples 32-34 resulted in improved tensile elongation and tear strength. The heat aging tests, however, revealed lower elongation retention after heat aging. Example 35 substituted a poly(etherimide-siloxane) copolymer having 20 wt % siloxane relative to the weight of the block copolymer for the copolymer having 20 wt % siloxane. The use of this poly(etherimide-siloxane) copolymer did not affect the properties, with the exception of a slight decrease in tensile elongation, and increase in overall stiffness.

In an effort to achieve better flame retardant properties, the flame retardant aluminum diethyl phosphinic acid was added at 8 weight percent in example 36. While the improved flame retardant properties were achieved with this example, the flexibility of the sample was compromised, showing poor tear strength, low tensile elongation and cracking after heat aging.

The thermoplastic compositions and articles made therefrom are further illustrated by the following embodiments, which are non-limiting.

Embodiment 1

A thermoplastic composition comprising 35-95 weight percent of a poly(etherimide-siloxane) copolymer having a siloxane content of more than 0 to less than 50 weight percent based on the total weight of the poly(etherimide-siloxane) copolymer; 5-65 weight percent of a polyester; and 0-20 weight percent of one or more additives; wherein the weight percent of each component is based on the combined weight of the polymer components.

Embodiment 2

The thermoplastic composition of embodiment 1, wherein the thermoplastic composition has one or more of the following properties: a flexural modulus of 200 to 3,000 megaPascals as determined by ASTM D790 at a thickness of 6.4 millimeters; and a tensile elongation at break of greater than or equal to 10% as determined by ASTM D638

Embodiment 3

The thermoplastic composition of embodiments 1 or 2, wherein the poly(etherimide-siloxane) copolymer is a block copolymer having a siloxane content of 5 to 50 weight percent, based on the total weight of the block copolymer, and comprises repeating units of formula (9) wherein Z is a residue of bisphenol A, $R^4$ is n-propylene, E is 2 to 50, n is 5 to 100, and each R' is methyl.

Embodiment 4

The thermoplastic composition of any one or more of embodiments 1 to 3, wherein the polyester comprises polyethylene terephthalate, polybutylene terephthalate, a thermoplastic polyester elastomer, poly(1,4-cyclohexanedimethylene terephthalate), polyethylene naphthalate, a poly(carbonate-ester) copolymer, an (isophthalate-terephthalate-resorcinol) copolycarbonate, or a combination comprising at least one of the foregoing.

Embodiment 5

The thermoplastic composition of any one or more of embodiments 1 to 4, wherein the polyester comprises polyethylene terephthalate, a thermoplastic polyester elastomer, poly(1,4-cyclohexanedimethylene terephthalate), a (isophthalate-terephthalate-resorcinol) copolycarbonate, or a combination comprising at least one of the foregoing.

Embodiment 6

The thermoplastic composition of any one or more of embodiments 1 to 5, wherein the thermoplastic composition comprises 40 to 65 wt % of polyethylene terephthalate.

Embodiment 7

The thermoplastic composition of any one or more of embodiments 1 to 5, wherein the thermoplastic composition comprises 40 to 65 weight percent of a combination of a poly(carbonate-ester) copolymer and a polyethylene naphthalate.

Embodiment 8

The thermoplastic composition of any one or more of embodiments 1 to 5, wherein the thermoplastic composition comprises 40 to 65 weight percent of poly(1,4-cyclohexanedimethylene terephthalate).

Embodiment 9

The thermoplastic composition of any one or more of embodiments 1 to 8, wherein the one or more additives comprises a thermal stabilizer, a hydrolysis stabilizer, a nucleating agent, a metal deactivator, a flame retardant additive, or a combination comprising at least one of the foregoing.

Embodiment 10

The thermoplastic composition of any one or more of embodiments 1 to 9, wherein the composition has a siloxane content of 1 to 25 percent by weight, based on the combined weight of the polymer components.

Embodiment 11

An article comprising the thermoplastic composition of any one or more of embodiments 1 to 10, wherein the article is an extruded part, an injection molded part, or a hot-compressed part.

Embodiment 12

An electrical wire comprising a conductor wire and a covering disposed over the conductor wire, wherein the covering comprises the thermoplastic composition of any one or more of embodiments 1 to 10; wherein the thermoplastic composition coating the conductor wire has one or more of the following properties: a tensile stress of greater than 20 MPa, determined according to UL-1581 after 24 hours at 23° C.; and a tensile elongation of greater than 10% as extruded, determined according to UL-1581.

Embodiment 13

The electrical wire of embodiment 12, wherein the thermoplastic composition coating the conductor wire has a tensile stress of greater than 20 MPa, determined according to UL-1581 after heat aging for 168 hours at 158° C.; and a tensile elongation of greater than 10%, determined according to UL-1581 after heat aging for 168 hours at 158° C.

Embodiment 14

The electrical wire of embodiments 12 or 12, wherein the thermoplastic composition coating the conductor wire has a tensile stress of greater than 20 MPa, determined according to UL-1581 after heat aging for 168 hours at 180° C.; and a tensile elongation of greater than 10%, determined according to UL-1581 after heat aging for 168 hours at 180° C.

Embodiment 15

The electrical wire of any one or more of embodiments 12 10 14, wherein the electrical wire achieves a pass rating in the single wire vertical flame propagation test conducted according to EN50265-2-1/IEC60332-1.

Embodiment 16

The electrical wire of any one or more of embodiments 12 to 15, wherein the electrical wire achieves a pass VWI rating in the single wire burn test conducted according to UL-1581.

Embodiment 17

The electrical wire of any one or more of embodiments 12 to 16, wherein the thermoplastic composition has a tear strength of greater than 20 N/mm, preferably greater than 25 N/mm, determined according to ISO 34-1 in the presence of the conductor wire.

Embodiment 18

The electrical wire of any one or more of embodiments 12 to 17, wherein the conductor wire comprises copper, aluminum, lead, gold, silver, iron, nickel, chromium, or an alloy comprising at least one of the foregoing, preferably copper.

Embodiment 19

The electrical wire of any one or more of embodiments 12 to 18, wherein the covering has a thickness of 0.1 to 1 millimeters.

Embodiment 20

An article comprising the electrical wire of any one or more of embodiments 12 to 19, preferably wherein the article is a construction component, a building component, an electrical device component, a railway vehicle component, an automobile component, a bus component, a marine vehicle component, or an aircraft component.

In general, the thermoplastic compositions and articles can alternatively comprise, consist of, or consist essentially of, any appropriate components herein disclosed. The thermoplastic compositions and articles can additionally, or alternatively, be formulated so as to be devoid, or substantially free, of any components, materials, ingredients, adjuvants or species used in the prior art compositions or that are otherwise not necessary to the achievement of the function or objectives of the present invention.

All ranges disclosed herein are inclusive of the endpoints, and the endpoints are independently combinable with each other. "Combination" is inclusive of blends, mixtures, alloys, reaction products, and the like. "Or" means "and/or." The terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. It is to be understood that the described elements may be combined in any suitable manner in the various embodiments.

As used herein, the term "hydrocarbyl" includes groups containing carbon, hydrogen, and optionally one or more heteroatoms (e.g., 1, 2, 3, or 4 atoms such as halogen, O, N, S, P, or Si). "Alkyl" means a branched or straight chain, saturated, monovalent hydrocarbon group, e.g., methyl, ethyl, i-propyl, and n-butyl. "Alkylene" means a straight or branched chain, saturated, divalent hydrocarbon group (e.g., methylene ($-CH_2-$) or propylene ($-(CH_2)_3-$)). "Alkenyl" and "alkenylene" mean a monovalent or divalent, respectively, straight or branched chain hydrocarbon group having at least one carbon-carbon double bond (e.g., ethenyl ($-HC=CH_2$) or propenylene ($-HC(CH_3)=CH_2-$). "Alkynyl" means a straight or branched chain, monovalent hydrocarbon group having at least one carbon-carbon triple bond (e.g., ethynyl). "Alkoxy" means an alkyl group linked via an oxygen (i.e., alkyl-O—), for example methoxy, ethoxy, and sec-butyloxy. "Cycloalkyl" and "cycloalkylene" mean a monovalent and divalent cyclic hydrocarbon group, respectively, of the formula —$C_nH_{2n-x}$ and —$C_nH_{2n-2x}$— wherein x is the number of cyclization(s). "Aryl" means a monovalent, monocyclic, or polycyclic aromatic group (e.g., phenyl or naphthyl). "Arylene" means a divalent, monocyclic, or polycyclic aromatic group (e.g., phenylene or naphthylene). The prefix "halo" means a group or compound including one more halogen (F, Cl, Br, or I) substituents, which can be the same or different. The prefix "hetero" means a group or compound that includes at least one ring member that is a heteroatom (e.g., 1, 2, or 3 heteroatoms, wherein each heteroatom is independently N, O, S, or P. Substituted" means that the compound or group is substituted with at least one (e.g., 1, 2, 3, or 4) substituents instead of hydrogen, where each substituent is independently nitro (—$NO_2$), cyano (—CN), hydroxy (—OH), halogen, thiol (—SH), thiocyano (—SCN), $C_{1-6}$ alkyl, $C_{2-6}$ alkenyl, $C_{2-6}$ alkynyl, $C_{1-6}$ haloalkyl, $C_{1-9}$ alkoxy, $C_{1-6}$ haloalkoxy, $C_{3-12}$ cycloalkyl, $C_{5-18}$ cycloalkenyl, $C_{6-12}$ aryl, $C_{7-13}$ arylalkylene (e.g, benzyl), $C_{7-12}$ alkylarylene (e.g, toluyl), $C_{4-12}$ heterocycloalkyl, $C_{3-12}$ heteroaryl, $C_{1-6}$ alkyl sulfonyl (—S(=O)$_2$-alkyl), $C_{6-12}$ arylsulfonyl (—S(=O)$_2$-aryl), or tosyl ($CH_3C_6H_4SO_2$—), provided that the substituted atom's normal valence is not exceeded, and that the substitution does not significantly adversely affect the manufacture, stability, or desired property of the compound. When a compound is substituted, the indicated number of carbon atoms is the total number of carbon atoms in the group, including those of the substituent(s).

All cited patents, patent applications, and other references are incorporated herein by reference in their entirety. While particular embodiments have been described, alternatives, modifications, variations, improvements, and substantial equivalents that are or can be presently unforeseen may arise to applicants or others skilled in the art. Accordingly, the appended claims as filed and as they may be amended are intended to embrace all such alternatives, modifications variations, improvements, and substantial equivalents.

The invention claimed is:
1. A thermoplastic composition comprising
  35-95 weight percent of a poly(etherimide-siloxane) copolymer having a siloxane content of more than 0 to less than 50 weight percent based on the total weight of the poly(etherimide-siloxane) copolymer;
  40-65 weight percent of a polyester comprising a combination of a poly(carbonate-ester) copolymer and a polyethylene naphthalate; and
  0-20 weight percent of one or more additives;
wherein the weight percent of each component is based on the combined weight of the poly(etherimide-siloxane) copolymer and the polyester.

2. The thermoplastic composition of claim 1, wherein the thermoplastic composition has one or more of the following properties:

a flexural modulus of 200 to 3,000 megaPascals as determined by ASTM D790 at a thickness of 6.4 millimeters; and a tensile elongation at break of greater than or equal to 10% as determined by ASTM D638.

3. The thermoplastic composition of claim 1, wherein the poly(etherimide-siloxane) copolymer is a block copolymer having a siloxane content of 5 to 50 weight percent, based on the total weight of the block copolymer, and comprises repeating units of the formula

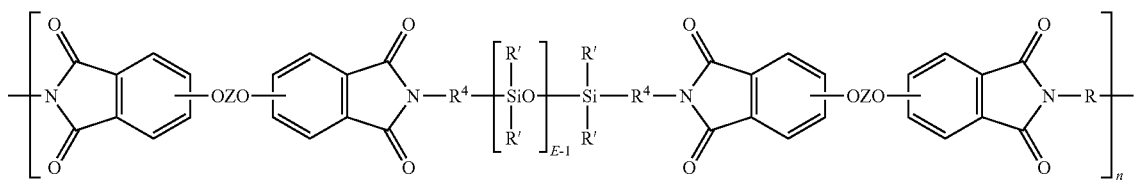

wherein Z is a residue of bisphenol A, $R^4$ is n-propylene, E is 2 to 50, n is 5 to 100, each R' is methyl, and R is phenylene.

4. The thermoplastic composition of claim 1, wherein the one or more additives comprises a thermal stabilizer, a hydrolysis stabilizer, a nucleating agent, a metal deactivator, a flame retardant additive, or a combination comprising at least one of the foregoing.

5. The thermoplastic composition of claim 1, wherein the composition has a siloxane content of 1 to 25 percent by weight, based on the combined weight of the polymer components.

6. An article comprising the thermoplastic composition of claim 1, wherein the article is an extruded part, an injection molded part, or a hot-compressed part.

7. An electrical wire comprising a conductor wire and a covering disposed over the conductor wire, wherein the covering comprises the thermoplastic composition of claim 1, wherein the thermoplastic composition coating the conductor wire has one or more of a tensile stress of greater than 20 MPa, determined according to UL-1581 after 24 hours at 23° C.; and a tensile elongation of greater than 10% as extruded, determined according to UL-1581.

8. The electrical wire of claim 7, wherein the thermoplastic composition coating the conductor wire has: a tensile stress of greater than 20 MPa, determined according to UL-1581 after heat aging for 168 hours at 158° C.; and a tensile elongation of greater than 10%, determined according to UL-1581 after heat aging for 168 hours at 158° C.

9. The electrical wire of claim 7, wherein the thermoplastic composition coating the conductor wire has: a tensile stress of greater than 20 MPa, determined according to UL-1581 after heat aging for 168 hours at 180° C.; and a tensile elongation of greater than 10%, determined according to UL-1581 after heat aging for 168 hours at 180° C.

10. The electrical wire of claim 7, wherein the electrical wire achieves a pass rating in the single wire vertical flame propagation test conducted according to EN50265-2-1/IEC60332-1.

11. The electrical wire of claim 7 wherein the electrical wire achieves a pass VW1 rating in the single wire burn test conducted according to UL-1581.

12. The electrical wire of claim 7, wherein the thermoplastic composition has a tear strength of greater than 20 N/mm, determined according to ISO 34-1 in the presence of the conductor wire.

13. The electrical wire of claim 7, wherein the conductor wire comprises copper, aluminum, lead, gold, silver, iron, nickel, chromium, or an alloy comprising at least one of the foregoing.

14. The electrical wire of claim 7, wherein the covering has a thickness of 0.1 to 1 millimeter.

15. An article comprising the electrical wire of claim 7.

* * * * *